US009770145B2

(12) United States Patent
Jochim et al.

(10) Patent No.: US 9,770,145 B2
(45) Date of Patent: Sep. 26, 2017

(54) HINGE, DAMPING DEVICE AND MOBILE TOILET

(71) Applicant: Dometic GmbH, Siegen (DE)

(72) Inventors: Tim Jochim, Wilnsdorf (DE); Jens Oxenfarth, Ennepetal (DE)

(73) Assignee: Dometic GmbH, Siegen (DE)

( * ) Notice: Subject to any disclaimer, the term of this patent is extended or adjusted under 35 U.S.C. 154(b) by 190 days.

(21) Appl. No.: 14/466,603

(22) Filed: Aug. 22, 2014

(65) Prior Publication Data

US 2015/0059072 A1    Mar. 5, 2015

(30) Foreign Application Priority Data

Aug. 29, 2013   (EP) .................................. 13182291

(51) Int. Cl.
*A47K 13/12*    (2006.01)
*A47K 13/26*    (2006.01)
(Continued)

(52) U.S. Cl.
CPC .............. *A47K 13/12* (2013.01); *A47K 11/02* (2013.01); *A47K 13/10* (2013.01); *A47K 13/26* (2013.01);
(Continued)

(58) Field of Classification Search
CPC ........ A47K 13/12; A47K 13/10; A47K 13/02; A47K 11/02; A47K 11/04
See application file for complete search history.

(56) References Cited

U.S. PATENT DOCUMENTS 3,611,449 A * 10/1971 Berry ..................... A47K 13/00
297/423.35
6,393,624 B1 * 5/2002 Iwashita ................ A47K 13/12
16/54
(Continued)

FOREIGN PATENT DOCUMENTS

AU    2014203470    3/2015
DE    202004013255    12/2004
(Continued)

OTHER PUBLICATIONS

Translation of European Search Report for EP 13182291.8 Feb. 4, 2014.
(Continued)

*Primary Examiner* — Janie Loeppke
(74) *Attorney, Agent, or Firm* — Middleton Reutlinger (57) ABSTRACT

The present embodiments relate to a hinge for use in a mobile toilet having a toilet bowl, a toilet seat, and a toilet lid, wherein the toilet seat and the toilet lid each are swivel-mounted to the toilet bowl by the hinge and have a common pivot axis. Furthermore, the present embodiments relate to a damping device for retrofitting a hinge. The present embodiments also relate to a mobile toilet. In particular, the present embodiments relate to the problem to allow an easy retrofitting of a hinge and mobile toilets, respectively. This problem is in particular solved with the initially described hinge that in accordance with the present embodiments has at least one receiving area that is formed to receive at least one damping device for damping the swivel motion of the toilet seat or the toilet lid about the pivot axis.

16 Claims, 4 Drawing Sheets

(51) Int. Cl.
*A47K 11/02* (2006.01)
*A47K 13/10* (2006.01)
B60R 15/04 (2006.01)
*E05D 3/04* (2006.01)
*E05D 11/08* (2006.01)
*E05F 5/00* (2017.01)

(52) U.S. Cl.
CPC .............. B60R 15/04 (2013.01); *E05D 3/04* (2013.01); *E05D 11/08* (2013.01); *E05F 5/00* (2013.01); *E05Y 2201/254* (2013.01); *E05Y 2600/522* (2013.01); *E05Y 2900/614* (2013.01)

(56) References Cited

U.S. PATENT DOCUMENTS

| | | |
|---|---|---|
| 6,687,921 B1 | 2/2004 | Li |
| 2002/0062518 A1 | 5/2002 | Hellwig et al. |
| 2009/0158516 A1* | 6/2009 | Tsai ..................... A47K 11/02 4/483 |

FOREIGN PATENT DOCUMENTS

| | | |
|---|---|---|
| DE | 102006020205 | 11/2007 |
| EP | 1199020 | 4/2002 |
| EP | 2842469 | 3/2015 |
| JP | 2004097342 | 4/2004 |

OTHER PUBLICATIONS

Translation of Office Action of European Patent Office for EP 13182291.8 Apr. 4, 2016.

\* cited by examiner

HINGE, DAMPING DEVICE AND MOBILE TOILET

CROSS REFERENCE TO PRIOR APPLICATION

This U.S. National Non-Provisional application claims benefit of 35 U.S.C. §119, and priority under 35 U.S.C. §365, to European Patent Application 13182291, filed on Aug. 29, 2013, which is currently pending and all of which is incorporated by reference herein.

BACKGROUND

Technical Field

The present embodiments relate to a hinge for use in a mobile toilet having a toilet bowl, a toilet seat and a toilet lid, wherein the toilet seat and the toilet lid each are swivel-mounted to the toilet bowl by the hinge and have a common pivot axis.

Further, the present embodiments relate to a damping device for retrofitting a hinge. In addition, the present embodiments relate to a mobile toilet with a toilet bowl, a toilet seat, and a toilet lid, wherein the toilet seat and the toilet lid each are swivel-mounted to the toilet bowl by a hinge and have a common pivot axis.

Description of Related Art

Mobile toilets are not connected to a stationary sewage system, but instead, for example, to a tank. Mobile toilets are used in vehicles such as caravans, airplanes, or ships, for example.

Hinges serve for the pivotable support of the seat arrangement of toilet lid and optionally toilet seat at a toilet bowl of a toilet such that in case of need the toilet is accessible or can be covered.

Damping devices that are also known as lowering automatism damp the lowering movement of the toilet lid and optionally the toilet seat to prevent noise and premature wear. Damping of the lowering movement is for example realized by a spring-prestressed sliding block guide or by means of a liquid-type damper. Arrangements of toilet lid and toilet seat with an integrated damping device are known. Furthermore, damping devices for retrofitting conventional stationary toilet are known.

In customary hinges and damping devices, it is necessary for an appropriate retrofitting to detach and at least partially replace the hinge along with the seat arrangement. For example, it could be necessary to replace the toilet lid and/or the toilet seat or the hinge, respectively, in total. Accordingly, retrofitting is currently consuming and complicated.

Moreover, known damping devices for retrofitting become an essential part of the hinge after installation; then pivotably support of the seat arrangement without the damping device in the hinge is not readily possible. If this for example is defect the damping device cannot easily be removed for replacement and the hinge cannot be used any more without it. Such a damping device is disclosed in EP 1 199 020 B1.

Thus, it is the object of the inventive embodiments to provide a novel hinge, a novel damping device and a novel mobile toilet, and in particular to allow a particularly fast, easy, space-saving, cost-effective retrofitting and an easy replacement of a damping device in a hinge or mobile toilet, respectively.

The information included in this Background section of the specification, including any references cited herein and any description or discussion thereof, is included for technical reference purposes only and is not to be regarded subject matter by which the scope of the instant embodiments are to be bound.

SUMMARY

This problem is solved by a hinge as described above that in accordance with the inventive embodiments has at least one receiving area configured to receive at least one damping device for damping the swivel motion of the toilet seat or the toilet lid about the pivot axis.

Now, by means of the receiving area retrofitting of the damping device is possible without dismounting the toilet seat, the toilet lid or the hinge in the assembled state of the hinge or in the assembling position of the hinge, respectively, into a toilet. Thus, a particularly fast, easy, space-saving and cost-effective retrofitting is achieved and the original hinge remains. To be able to provide the receiving area according to the present embodiments, it had to be broken with the conventional construction of a hinge for stationary toilets. Customary hinges are attached to a ceramic toilet bowl by means of a rodding of metal. So to speak, the rodding serves as an axis that pivotably connects the parts of the hinge. The hinge according to the present embodiments has a novel structure without a rodding. By the receiving area instead of the rodding it is now possible to realize a particularly suitable reception of a supplementary damping device.

The receiving area may be configured such that the supplementary damping device can be attached to the receiving area without any tools to allow a particularly fast and simple retrofitting. The tool-free mounting option is particularly advantageous when space is restricted.

According to a development the hinge has a second receiving area configured to receive a second damping device for damping the swivel motion of the toilet seat or the toilet lid about the pivot axis. In this way, a hinge can be provided that can suitably receive two damping devices, each for the toilet seat and the toilet lid.

The first and/or second receiving area has a mounting opening, preferably for inserting a damping device into the first and/or second receiving area without any tools. By means of the mounting opening a direct and fast access to the contact area is also provided in the assembled state of the hinge.

Receiving area and mounting opening may be configured at least partially corresponding to the supplementary damping device, so that this can be inserted into the receiving area accurately, for example.

In a further development, the first and/or second receiving area is configured at least partially symmetrical, preferably rotation-symmetrical relative to the pivot axis. In this way, a supplementary damping device can be oriented for a particularly suitable operative connection with the hinge. In particular, an arrangement is possible such that the rotational axis of the supplementary damping device and the pivot axis of the hinge are congruently arranged or align with each other, respectively.

For a suitable operative connection between the hinge, the toilet bowl, the toilet seat and the toilet lid as well as a damping facility in a further development the first and/or second receiving area is formed of a first reception assigned to the toilet bowl, a second reception assigned to the toilet seat and a third reception assigned to the toilet lid.

According to a development the first reception is formed as one piece with the toilet bowl, the second reception is formed as one piece with the toilet seat, and the third reception is formed as one piece with the toilet lid. In this way, a particularly space-saving hinge can be provided. Further, the hinge according to the present embodiments is thus inexpensive to produce since no separate work process is necessary, but to a certain extent the hinge is integrated into the respective components of the toilet.

For example, the hinge according to the present embodiments can be prepared by injection molding. Preferably, the hinge at least partially can be prepared from an elastic plastic.

The receptions of the hinge and the toilet bowl, toilet seat and toilet lid, which are each formed as one piece therewith, can be pivotally engaged. Unlike conventional hinges in the hinge according to the embodiments, a direct arrangement of the hinge members to each other without a rodding can be realized. With this innovation over the conventional hinge on the one hand space for receiving a supplementary damping device is provided. On the other hand, by the direct arrangement it is possible that the hinge both with and without the supplementary damping device independently functions as a hinge. For that, the hinge can have at least one integrated engaging means to allow a direct and space-saving arrangement of the hinge members to each other.

The integrated engaging means can be configured at least partially rotation-symmetrical relative to the pivot axis of the hinge to allow a suitable rotatable arrangement of the hinge members to each other. Preferably, in this way the engaging means can be formed on the edges of the receptions, so that the receptions or the receiving area substantially remain free for receiving a damping device. For example, the integrated engaging means can be formed as a circular groove. Further, the engaging means can be formed as an annular projection.

According to a development the first and the second reception of the first and/or second receiving area may be configured for the form-closed and/or force-closed reception of a damping device. In this way, a damping device for damping the lowering movement of the toilet seat in operative connection with the receptions assigned to the toilet bowl and the toilet seat can be arranged in a particularly easy and fast manner. In this way, the damping device further can be installed in the hinge without additional fastening means or tools.

Accordingly, for installation of a damping facility for damping the lowering movement of the toilet lid in a further development the first and third reception of the first and/or second receiving area are formed for the form-closed and/or force-closed reception of a damping device.

For example, the receptions may have a shape that at least partially corresponds to a damping device.

For the form-closed and/or force-closed reception of a damping device the first, second and/or third reception of the first and/or second receiving area in accordance with a further development have at least one groove-like recess. In this way, it is particularly easy to realize a mechanically detachable connection between the damping device and the reception.

Preferably, the groove-like recess can be formed such that a supplementary damping device having a corresponding projection for engagement with the groove-like recess can be inserted into the receiving area with the recess.

For that, the groove-like recess can have a longitudinal extension extending in parallel to the pivot axis of the hinge to enable a particularly easy and fast positioning of a supplementary damping device relative to the pivot axis of the hinge.

For example, the groove-like recess can be formed as a rectangular recess that leads to the mounting opening.

The problem according to the inventive embodiments further is solved by the initially described damping device for retrofitting a hinge, wherein said damping device can be installed in a hinge according to the embodiments in accordance with the above-described developments. In this way, a damping device can be provided that is adjusted to the hinge according to the embodiments and thus, enables an easy and fast retrofitting without dismounting or replacement of the hinge or the seat arrangement of the mobile toilet.

In a further development, the damping device is formed of at least two connected damper parts that are rotatable mutually and about a common rotational axis, wherein a damper for damping the rotational motion is provided between the at least two damper parts. Such a construction has already proven in damping facilities for stationary toilets. However, such damping devices have not been used for mobile toilets so far.

In a further development, for damping the swivel motion of the toilet seat about the pivot axis the damping device can be received form-closed and/or force-closed in the first reception and the second reception. In this way, the damping facility can be installed fast and without additional fastening means or tools in operative connection to the toilet bowl and toilet seat.

In accordance with a further development, the damping facility can be received form-closed and/or force-closed in the first reception and the third reception to accordingly enable the realization of a damping of the swivel motion of the toilet lid about the pivot axis.

In a further development, at least one projection is arranged on at least one damper part. By means of said projection engagement of the damping device with the hinge for a form-closed and/or force-closed connection can be realized.

Particularly preferred, the projection is formed at least partially corresponding to a groove-like recess in the above-described hinge. The projection can have a substantially longitudinal, rectangular shape.

In a further development, the damping device is formed at least partially symmetrical, preferably rotation-symmetrical relative to the pivot axis. So, the damping device can be inserted into a hinge particularly easy.

For example, the damping device can be shaped at least partially cylindrically. Further, the damping device can have at least partially a substantially rectangular shape.

In addition, the object of the inventive embodiments is solved by the initially described mobile toilet having the above-described hinge according to the embodiments.

According to a further development, the mobile toilet has the above-described damping facility according to the embodiments.

BRIEF DESCRIPTION OF THE DRAWINGS

In the following, the hinge according to the inventive embodiments and the damping device according to the inventive embodiments, as well as the mobile toilet according to the inventive embodiments are explained in more detail on the basis of one of the embodiments illustrated in the drawings. Here.

In the figures, same reference symbols are used for identical parts.

DETAILED DESCRIPTION

Figure 1:
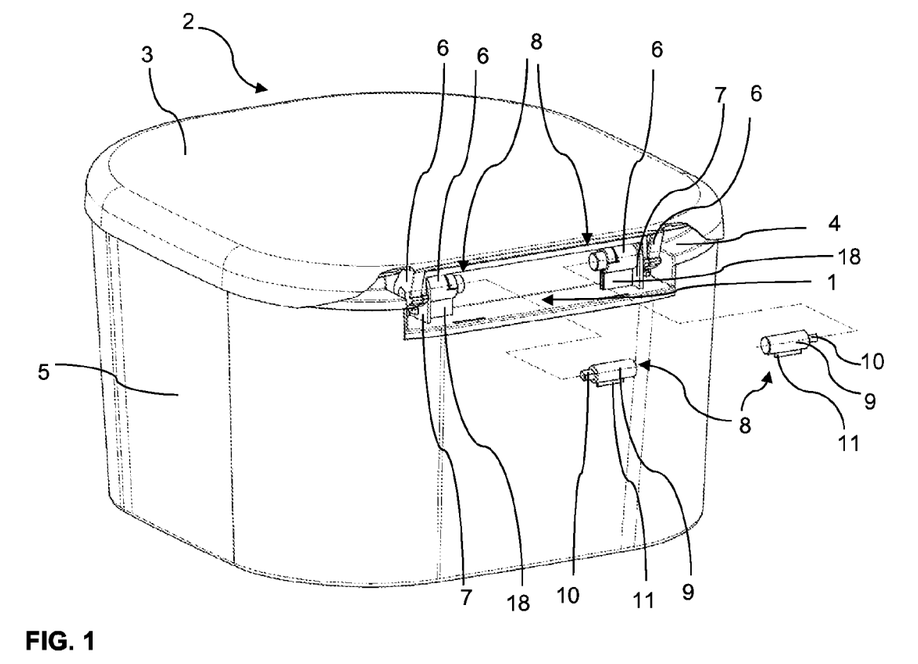
FIG. 1 schematically shows a perspective view of an arrangement of a hinge in a mobile toilet and four damping devices each according to the one embodiment.

FIG. 1 shows the embodiment of a hinge 1 according to the present embodiments in the assembled state in a mobile toilet 2 for a caravan with a toilet lid 3 as well as a toilet bowl 4 with a bowl casing 5. Hinge 1 is formed of several members and has three pairs of hinge members 6. Said hinge members 6 each are formed as one piece with the components of the toilet 2. One pair of hinge members 6 is formed as one piece with the toilet lid 3. A further pair of hinge members 6 is formed as one piece with the toilet bowl 4 as a hinge receiving facility 7 for arranging the remaining hinge members at the toilet bowl 4. It is also conceivable to form the hinge receiving facility 7 separately from the toilet bowl 4 to also allow the use in customary toilets with a ceramic toilet bowl.

Moreover, FIG. 1 shows the embodiment of a damping device 8 according to the present embodiment. One pair of such damping devices 8 is installed in the hinge 1 for retrofitting. Furthermore, an additional pair of damping devices 8 is shown. The damping devices 8 each have a substantially cylindrical main body 9 and a substantially rectangular rotational body 10 that are rotatably mounted to each other.

Furthermore, the damping device 8 according to the present embodiments has a bung-like projection 11 that is formed substantially rectangular and extends in a longitudinal direction of the cylindrical main body 9.

Figure 2:
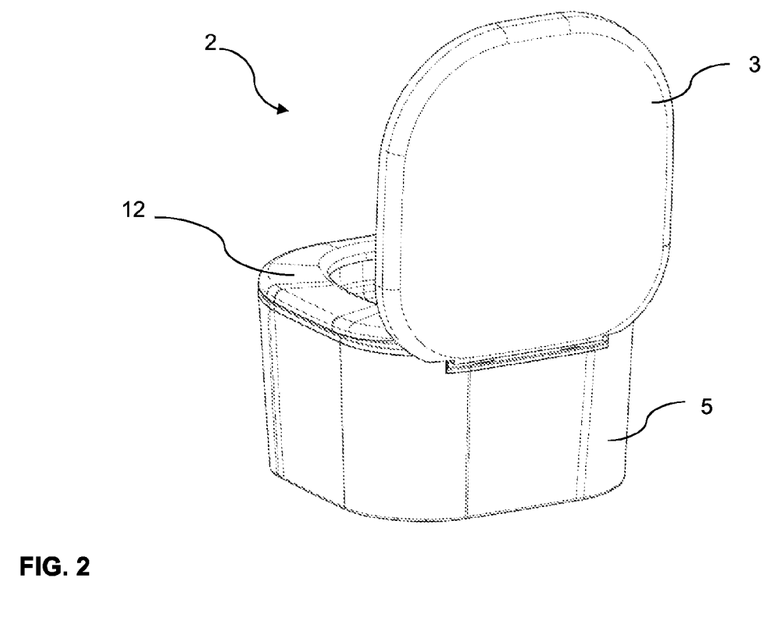
FIG. 2 schematically shows a perspective view of the mobile toilet.

FIG. 2 shows the mobile toilet 2 with a raised lid 3. The mobile toilet 2 has a toilet seat 12.

Figure 3:
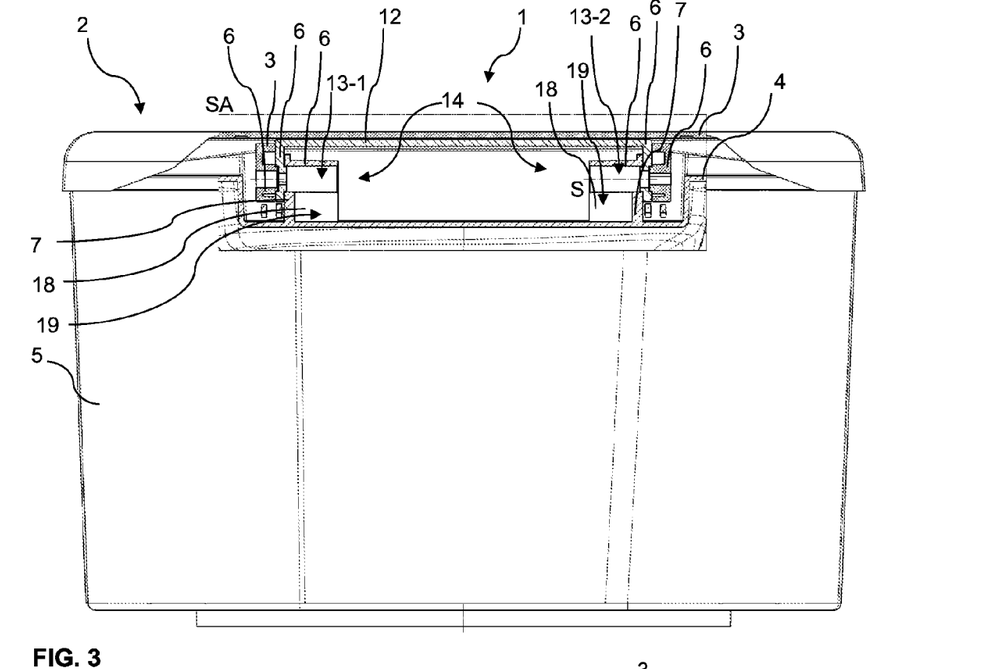
FIG. 3 schematically shows a front view of the embodiment of the hinge and the mobile toilet in section in accordance with sectional area SA.

FIG. 3 shows that the hinge 1 according to the embodiment illustrated in FIG. 1 additionally comprises a pair of hinge members 6 that are formed as one piece with the toilet seat 12. Hinge 1 has a pivot axis S, with the attached toilet seat 12 and toilet lid 3 being pivotably supported at the toilet bowl 4 relative to said pivot axis S by means of the hinge 1.

In addition, FIG. 3 shows that the hinge 1 according to the inventive embodiments has two opposite receiving areas 13-1, 13-2, a first left-sided receiving area 13-1 and a second right-sided receiving area 13-2, that each are formed to receive a supplementary damping device 8. The receiving areas 13-1, 13-2 are accessible also in the assembled state of the hinge by means of mounting openings 14. The hinge members 6 are engaged with each other.

Figure 4:
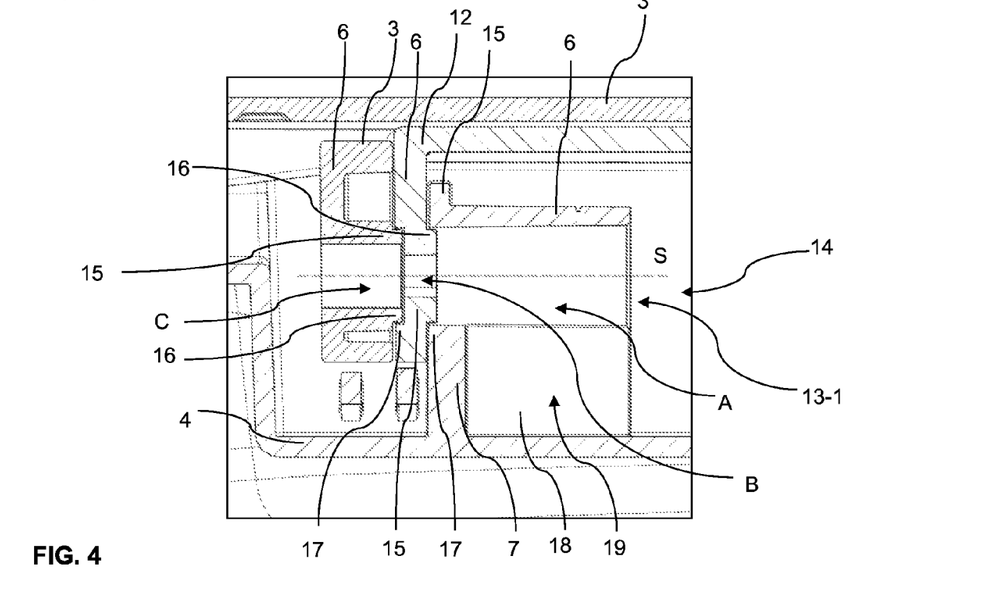
FIG. 4 schematically shows an enlarged view of sectional area SA.

FIG. 4 shows an enlarged section of the left area of the hinge 1 according to FIG. 3. The first left receiving area 13-1 of the hinge 1 has three receptions A, B, C, with the first reception A being assigned to the toilet bowl 4, the second reception B being assigned to the toilet seat 12, and the third reception C being assigned to the toilet lid 3. The second reception B is arranged to the hinge member 6 that is formed as one piece with the toilet seat 12. For receiving a damping device 8 for damping the lowering movement of the toilet seat 12 the second reception B is formed for the form-closed reception of the rotational body 10 of the damping device 8. A first reception A that is rotation-symmetrical relative to the pivot axis S is arranged to the hinge member 6 that is formed as one piece with the toilet bowl 4. In said first reception A the correspondingly formed cylindrical main body 9 of the damping device 8 formed according to the embodiments can be arranged form-closed. However, the third reception C arranged to the hinge member 6 that is formed as one piece with the toilet lid 3 is not configured for an operative connection with the damping device 8.

Moreover, FIG. 4 shows that the hinge members 6 and the receptions A, B, C, respectively have integrated engaging means 15. In this case, the engaging means 15 are rotation-symmetrically formed relative to the pivot axis S of the hinge, which makes the engaged hinge members 6 rotatable. In the assembling position the engaging means 15 of the outer hinge members 6 in the form of annular projections engage with corresponding engaging means 15 of the respective inner hinge members 6 in the form of circular grooves 17. The engaging means 15 each are formed at the edges of the receptions A, B, C of the hinge members 6.

Figure 5:
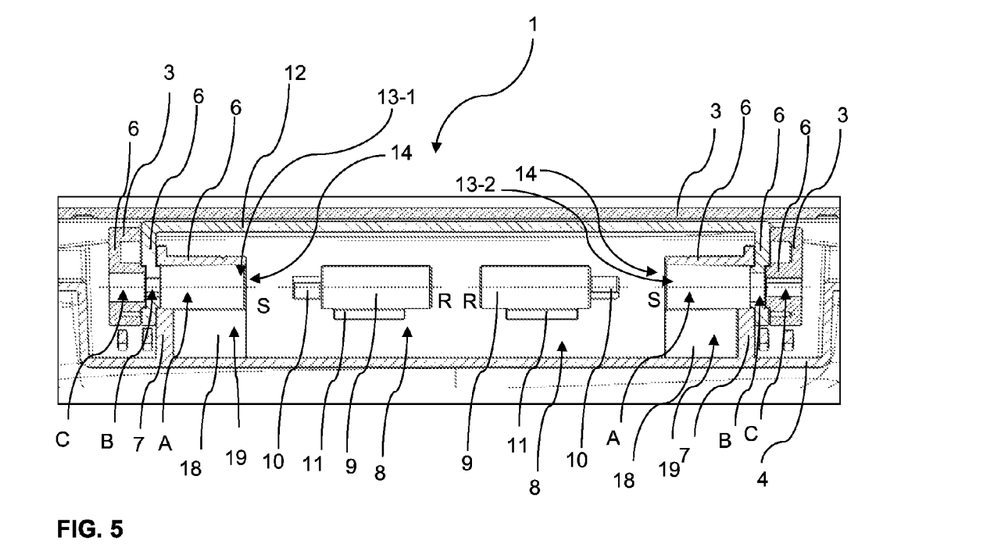
FIG. 5 schematically shows a front view of an arrangement of a hinge with two damping devices each according to the one embodiment in section.

FIG. 5 shows an arrangement of a hinge 1 according to the present embodiments illustrated in FIG. 1, FIG. 3, and FIG. 4 and two damping devices 8 according to the embodiment illustrated in FIG. 1. The right-sided second receiving area 13-2 also has three receptions A, B, C each assigned to toilet bowl 4, toilet seat 12 and toilet lid 3. The hinge members 6 in the right area of the hinge 1 according to the embodiments are formed to receive a damping device 8 for damping the lowering movement of the toilet lid 3. For that, the reception C of hinge member 6 that is formed as one piece with the toilet lid 3 is formed for the form-closed reception of the rotational body 10 of the damping device 8. The reception B of hinge member 6 that is formed as one piece with the toilet seat 12 is not configured for the form-closed reception of the rotational body 10. The right-sided hinge member 6 that is formed as one piece with the toilet bowl 4 has a reception A for the form-closed reception of the cylindrical main body 9 of the damping device 8. In this way, an operative connection of the damping device 8 with the toilet lid 3 can be realized.

As illustrated in FIG. 5, the damping devices 8 each have a rotational axis R. The cylindrical main bodies 9 of the damping devices 8 are rotation-symmetrical, the rotational bodies 10 are formed symmetrically to said rotational axis R. For insertion of the damping devices 8 into the receiving areas 13 of the hinge 1 according to the present embodiments the rotational bodies 10 of the damping devices 8 are directed towards the mounting opening 14. Furthermore, the rotational axes R of the damping devices 8 align with the pivot axis S of the hinge 1.

Figure 6:
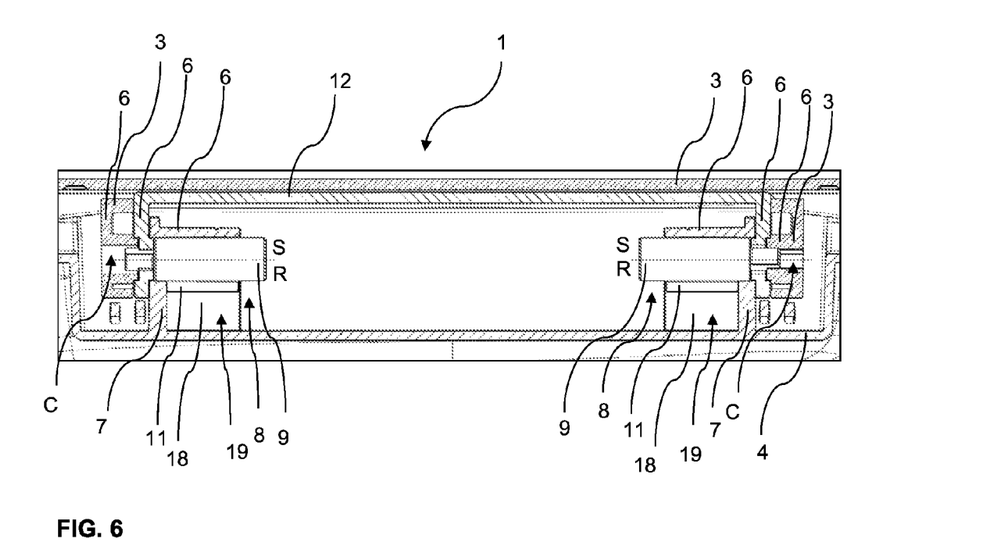
FIG. 6 schematically shows a front view of an arrangement of a hinge with two installed damping devices each according to the one embodiment in section.

FIG. 6 shows an arrangement of the embodiment of the hinge 1 illustrated in FIG. 1 and FIG. 3 to FIG. 5 with two installed damping devices 8 according to the embodiment illustrated in FIG. 1 and FIG. 5. The damping devices 8 are arranged in the receptions A, B, C of the respective receiving areas 13-1, 13-2 of the hinge 1, with the receiving areas 13-1, 13-2 and the damping devices 8 corresponding such that the respective rotational axes R are congruently directed with the pivot axis S of the hinge 1. The main bodies 9 of the damping facilities 8 each are form-closed fixed in the two receptions A that are assigned to the toilet bowl. The damping device 8 on the left side of the hinge 1 is in operative connection with the toilet seat 12. For that, rotational body 10 of the damping device 8 arranged on the left side is form-closed configured in the reception B of the hinge member 6 that is formed as one piece with the toilet seat 12. On the other side, the damping device 8 on the right side is in operative connection with the toilet lid 3. The rotational body 10 of the right-sided damping device 10 is form-closed arranged in the receiving area C of the hinge member 6 that is formed as one piece with the toilet lid 3.

Figure 7:
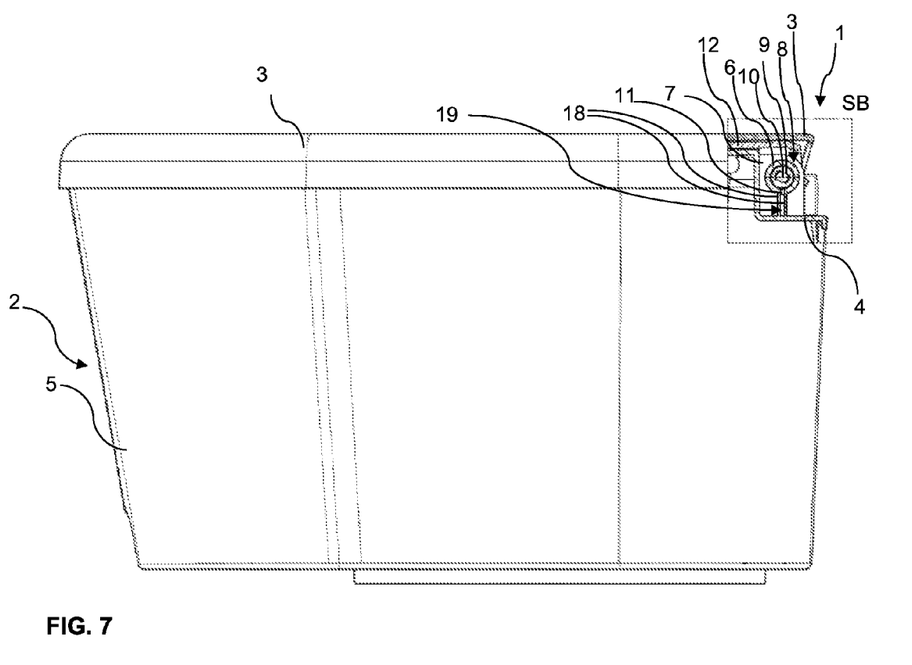
FIG. 7 schematically shows a side elevation of the arrangement according to FIG. 6 in the assembling position in the mobile toilet in section according to sectional area SB; and, FIG. 8 schematically shows an enlarged view of sectional area SB according to FIG. 7.

FIG. 7 shows a side elevation of the first receiving area 13-1 of the arrangement according to FIG. 6. The hinge members 6 that are formed as one piece with the toilet bowl 4 each have two parallel walls 18 spaced to each other. The walls 18 are spaced such that reception A has a groove-like recess 19 for receiving the bung-like projection 11 of the damping facility, cf. FIG. 4. The recess 19 leads to the respective mounting opening 14.

Figure 8:
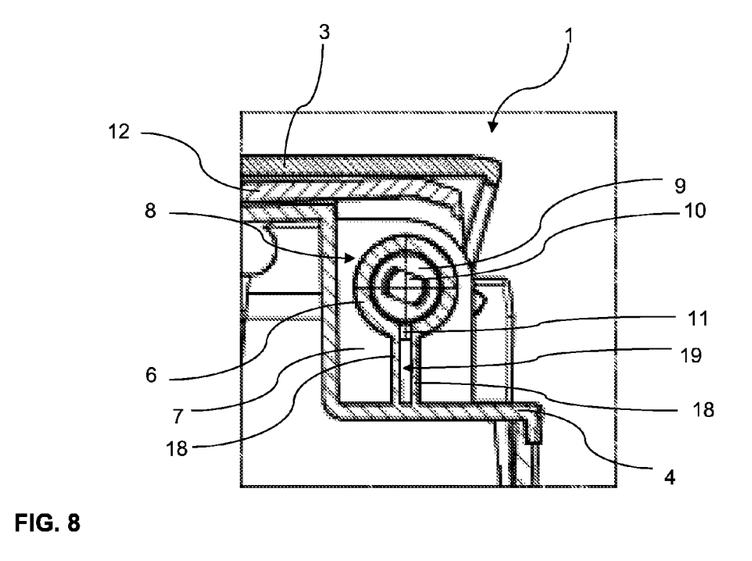

FIG. 8 shows an enlarged section of the above-mentioned arrangement according to FIG. 7. FIG. 7 and FIG. 8 show that the cylindrical main body 9 and the bung-like projection of the damping device 8 are form-closed arranged in the reception A and the groove 19 of the hinge member 6 that is formed as one piece with the toilet bowl 4.

The foregoing description of several methods and embodiments has been presented for purposes of illustration. It is not intended to be exhaustive or to limit the inventive embodiments to the precise steps and/or forms disclosed, and obviously many modifications and variations are possible in light of the above teaching. It is intended that the scope of the present embodiments and all equivalents be defined by the claims appended hereto.

REFERENCE NUMBERS

1 Hinge
2 Toilet
3 Toilet lid
4 Toilet bowl
5 Bowl casing
6 Hinge member
7 Hinge receiving facility
8 Damping device
9 Main body
10 Rotational body
11 Projection
12 Toilet seat
13-1 first receiving area
13-2 second receiving area
14 Mounting opening
15 Engaging means
16 Projection
17 Groove
18 Wall
19 Recess
A first reception
B second reception
C third reception
R Rotational axis
S Pivot axis
SA Sectional area
SB Sectional area

The invention claimed is:

1. A hinge for use in a mobile toilet, comprising: a toilet bowl, a toilet seat and a toilet lid, wherein the toilet seat has a toilet seat hinge member and the toilet lid has a toilet lid hinge member, each of which are swivel-mounted relative to a toilet bowl hinge member on the toilet bowl, said hinge members having hollow receptions and a common pivot axis, the hollow receptions configured to receive at least one damping device to damp the swivel motion of the toilet seat or the toilet lid about the pivot axis, said hinge being selectively dampable and interchangeable wherein in a first mode of operation said toilet lid hinge member and said toilet seat hinge member operably engage said toilet bowl hinge member by way of integrated grooves and projections to swivel relative to said toilet bowl hinge member without said damping device, and said hollow receptions remain unobstructed in said first mode of operation, and in a second mode of operation wherein said hollow receptions receive said damping device to provide said damped swiveling of said toilet seat or said toilet lid.

2. The hinge according to claim 1, said hinge defining a first receiving area and a second receiving area configured to receive a second damping device for damping the swivel motion of the toilet seat or the toilet lid about the pivot axis.

3. The hinge according to claim 2 wherein at least one of the first and second receiving area has a mounting opening, to insert said at least one damping device into the at least one of said first and second receiving area without any tools.

4. The hinge according to claim 2 wherein at least one of the first and second receiving area is configured at least partially symmetrical, relative to the pivot axis.

5. The hinge according to claim 2 wherein at least one of the first and second receiving area is formed of a first reception assigned to the toilet bowl, a second reception assigned to the toilet seat, and a third reception assigned to the toilet lid.

6. The hinge according to claim 5 wherein the first reception is formed as one piece with the toilet bowl, the second reception is formed as one piece with the toilet seat, and the third reception is formed as one piece with the toilet lid.

7. The hinge according to claim 5 wherein the first and second receptions of the first and second receiving areas are formed for at least one of form-closed and force-closed reception of the damping device.

8. The hinge according to claim 5 wherein the first and third receptions of the first and second receiving areas are formed for at least one of form-closed and force-closed reception of the damping device.

9. The hinge according to claim 5 wherein the first, second and third receptions of the first and second receiving areas have at least one groove-like recess.

10. The hinge of claim 1 further comprising the at least one damping device for retrofitting the hinge for the mobile toilet.

11. The hinge of claim 10 wherein the damping device is formed of at least two connected damper parts that are rotatable mutually and about a common rotational axis and a damper for damping the rotational motion is provided between the at least two damper parts.

12. The hinge of claim 10 wherein the damping device is for damping the swivel motion of the toilet seat about the pivot axis and is capable of being received one of form-closed and force-closed in a first reception and a second reception.

13. The hinge of claim 10 wherein the damping device for damping the swivel motion of the toilet lid about the pivot axis and is capable of being received one of form-closed and force-closed in the first reception and a third reception.

14. The hinge of claim 10 further comprising a projection is arranged at at least one damper part.

15. The hinge of claim 10 wherein the damping device is formed at least partially symmetrical, relative to the pivot axis.

16. A mobile toilet, comprising: a toilet bowl, a toilet seat and a toilet lid, wherein the toilet seat and the toilet lid each are swivel-mounted to the toilet bowl by a hinge having a toilet bowl hinge member, a toilet seat hinge member and a toilet lid hinge member, each of said hinge members having a common pivot axis, each hinge member defining a hollow reception which receives a portion of at least one damping device, said hinge being selectively dampable and interchangeable wherein in a first mode of operation said toilet seat hinge member and said toilet lid hinge member operably swivel relative to said toilet bowl hinge member without said damping device due to grooves and projections integrated with said hinge members and said hollow receptions remaining unobstructed in said first mode of operation due to grooves and recesses integrated with said hinge members, and in a second mode of operation said damping device is received in said reception area to dampen movement of said toilet lid or said toilet seat.

* * * * *